July 28, 1964 R. H. YEO ETAL Re. 25,626
AIR-HEATING GAS BURNER
Original Filed Oct. 20, 1958 3 Sheets-Sheet 1
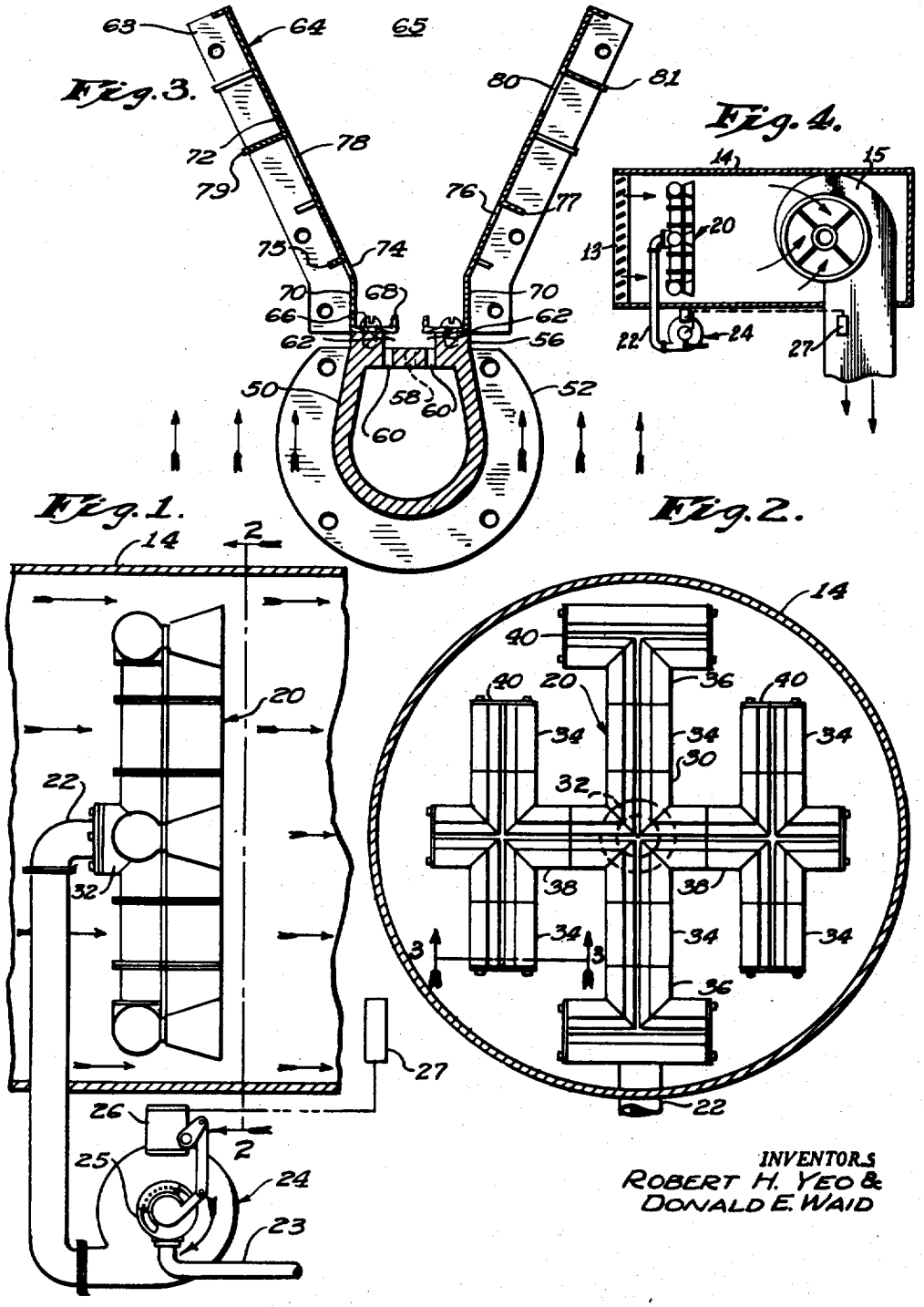
INVENTORS
ROBERT H. YEO &
DONALD E. WAID

AIR-HEATING GAS BURNER

Original Filed Oct. 20, 1958 3 Sheets-Sheet 2

INVENTORS
ROBERT H. YEO &
DONALD E. WAID

INVENTORS
ROBERT H. YEO &
DONALD E. WAID

United States Patent Office

Re. 25,626
Reissued July 28, 1964

25,626
AIR-HEATING GAS BURNER

Robert H. Yeo and Donald E. Waid, Muncie, Ind., assignors to Maxon Premix Burner Company, Inc., Muncie, Ind., a corporation of Indiana Original No. 3,051,464, dated Aug. 28, 1962, Ser. No. 768,261, Oct. 20, 1958. Application for reissue May 22, 1963, Ser. No. 284,774
17 Claims. (Cl. 263—19)

Matter enclosed in heavy brackets [ ] appears in the original patent but forms no part of this reissue specification; matter printed in italics indicates the additions made by reissue.

This invention relates to gas burners, and to gas-burner means for intimately mixing fuel gas, or gas-air mixtures, with additional or excess air for complete and clean combustion. It is a particular purpose of the invention to provide a gas burner which, while having other uses, is especially adapted for operation in an air stream to heat the air of such stream and which will utilize the air of the air stream to supply part or all of the air required for high-capacity combustion of the gaseous fuel. It is a further particular purpose of the invention to provide an air-heating burner combination which will have a high turn-down ratio, that is, a high ratio between its maximum and minimum rates of operation, and which can be readily throttled or adjusted over its whole range of operation with smooth and continuous variation of its heat output. By "air" we mean both normal air and oxygen-containing gas in streams other than fresh air streams, such for example as a recirculating industrial oven atmosphere containing less than a normal percentage of oxygen.

The invention is applicable to a number of different air heating applications and provides various advantages over prior burners available for such applications. These applications include the following, which are cited as illustrative and not by way of limitation.

I. Heating air for factories and other manufacturing and processing establishments, as to supply heated air for ventilating and other purposes, supplementing normal space heating facilities.—In recent years it has become increasingly common practice to exhaust large quantities of air from inside industrial or commercial buildings for the removal of fumes, vapors, dust, or other foreign or waste material deleterious to the workers or to the product being handled or to the operations being carried on within the building. The exhausted air is replaced by fresh air taken in from outside the building, and when the outside air is below room temperature it is necessary to heat this replacement or "make-up" air, and frequently to heat it to a very closely controlled temperature, in order to avoid discomfort to the workers or damage to the product or process within the building. It is also essential that the heated air be clean and ordor free. In painting operations, for example, large volumes of clean make-up air are required to be supplied to painting booths and such air must be within close temperature limits both for comfort and in order to maintain uniform painting conditions.

A basic problem in this type of heating application is the wide variation in heat inputs required from the gas burner system. If the desired temperature within the building is 70° F. and the outdoor air is 66° F., there will be only 4° F. differential between the temperatures of the outside and inside air. Under such conditions, while heating will be unavoidable, the heat input required from the gas burners will be extremely small. Conversely, in severe winter weather the temperature of the outdoor air may be as low as —10° F., and the temperature differential will thus be 80° F., which will require a very high heat input from the gas burners being used to heat the make-up air for the building. Accordingly, it is necessary that the gas burner system be capable of operating through a wide range of heat inputs. The relationship between the extreme maximum heat input and the extreme minimum heat input in air-stream burners is desirably not less than a ratio of 25-to-1, and preferably greater. A further problem in such application is the need to adjust the heating rate, over that whole range, in order to meet the continuously variable heat demand.

The most satisfactory gas burners previously available for heating make-up air are the so-called line burners, in which a burner assembly is arranged across the stream of make-up air and in which combustion occurs directly in the air stream at a series of closely spaced or overlapping points along the lines of a pattern distributed across the air stream. While such burners provide clean combustion of gaseous fuel when operating conditions are favorable, they have narrowly limited operating characteristics. Their poor flame retention ability severely limits their maximum operating rate in air stream applications, and limits the air stream velocities in which they can be used. These limitations severely restrict their turn-down ratio in air stream applications. Their turn-down ratio is also held down by the limits on fuel mixutre pressures and discharge velocities which must not be exceeded if flame retention is to be maintained.

Neither such line burners nor any other single gas burner system within our knowledge heretofore available for make-up air installations is capable of providing the 25-to-1 turn-down range needed in such installations. Accordingly, it has heretofore been necessary to use a costly multiple arrangement of two or more gas burner systems with part of the gas burners being automatically shut off and turned on as the temperature differential between inside and outside air varies to change the heat demand. Not only are these multiple systems costly, but in them it is impossible to avoid abrupt changes in heating rate when part of the gas burners are turned on and off, with the result that there is a sudden jump in air temperature when the supplementary burners are turned on and a sudden drop in air temperature when the supplementary burners are turned off. These sudden changes are highly objectionable.

There is thus an acute need in the industry for a gas burner system which can be throttled or adjusted smoothly and continuously throughout a broad range of heat inputs without alternatively turning on or off any portion of the gas burner system. It is one of the objects of our invention to meet this need and to provide additional improvements in burners for this air-heating application.

II. Supplying heat for industrial ovens and similar facilities in which hot-air-in-motion is used as a processing medium for drying, baking, curing, tempering, and other similar industrial or commercial processes.—Many industrial oven installations recirculate hot air through the oven or processing chamber, and add such heat to the recirculating stream as is necessary to maintain the desired air temperature. In most such installations it is necessary to add fresh air continuously to the circulating atmosphere of the oven, and to exhaust a corresponding amount of such atmosphere by a suitable stack or fan, in order to provide necessary ventilation and avoid build-up of explosive or combustible gaseous mixtures within the oven. For heating economy, however, the amount of ventilating air added to the recirculating stream is held to a minimum, and may be of the order of 20% of the recirculating stream. The necessary heat is commonly supplied to the recirculating stream by operating burners such as line burners in the recirculating stream itself.

In the recirculating stream, the "air" or oven atmosphere is not normal air but is mixed with quantities of various gases such as excess nitrogen, carbon dioxide, water vapor, etc., resulting from the oven processes and the combustion in the recirculating stream and from the continuous recirculation with only small amounts of added ventilation air. Accordingly, the "air" stream is deficient in oxygen, and the oxygen-lean air is not well suited to usual combustion requirements. As noted above, the "air" and "air stream," we mean to include both normal air and other atmospheres in which a gas burner is operated.

Until fairly recently, it was considered necessary in order to obtain clean and complete combustion of the fuel for this heating application that all or substantially all of the air required for combustion be supplied from outside the oven as by means of an external blower. Moreover, the available burners have provided a turn-down ratio of not more than about 4-to-1 or 5-to-1.

More recently, efforts have been made to reduce the amount of outside air required for combustion and to utilize substantial percentages of combustion air from the recirculating stream, in order to reduce or eliminate the external blower requirements and to reduce the expense of installation and operation of the burner system. But these attempts to depend largely or entirely on the oxygen-lean atmosphere of the oven to supply the oxygen for combustion have frequently resulted in poor quality of combustion. In many cases, incomplete burning of the gas has resulted in damage to the product from fumes or from free carbon deposited as soot. The basic cause of these difficulties has been an inadequate intermixing of the gas fuel with the oxygen-lean atmosphere of the oven.

It is one of the objects of our invention to provide a burner in which greatly improved intermixing is obtained between the gaseous fuel and "air" from the recirculating oven atmosphere, thereby securing a more effective utilization of the oxygen in that oxygen-lean atmosphere. Burners embodying the invention can obtain complete and immediate combustion of gaseous fuel in oven installations, using the oven atmosphere to supply high proportions or even the entire amount of oxygen required for combustion. The requirements for the external air are thus reduced or avoided, and external blowers can be smaller or eliminated entirely. Our new burners operate in higher air stream velocities, thus permitting smaller duct sizes. Our burners may use air stream flow not only to cause intermixing of air-gas mixtures with secondary air, but in certain cases can use such flow to induce intermixing flow of gas and primary air.

Further, the invention provides high turn-down ratios in oven applications, and while we can go higher, in such applications we may use burner forms providing ratios ranging up to about 15-to-1. This is substantially higher than previously available and is highly beneficial, for example, in eliminating over-riding of temperatures during periods of low demand while providing higher speed in bringing the installation up to operating temperatures.

III. Heating air in simple non-recirculating drying applications.—In grain dryers and other simple applications for heating, dehydrating, and the like, a gas burner is operated in an air supply duct in a relatively simple system where the primary need is a simple, inexpensive, and reliable burner which gives large heat inputs in a duct system of reasonable size. The principal difficulty with burners heretofore used is excessive flame length from the burners, which makes it necessary to use long ducts and may cause damage by spot heating of duct work and fans.

Particularly in these simple applications, as well as in most other applications, our new burners are especially advantageous in their unique ability to intermix larger quantities of fresh air more completely at the face of the burner, and to burn with a much shorter flame length than prior burners; and to do so at high heat input rates and in high air velocities.

As illustrated above, our invention has as a principal object the provision of a gas burner having improved mixing means for intermixing gas and air at the face of the burner, and for doing so at varying rates of operation. It is a further principal object of the invention to provide a gas burner which is especially applicable for operation in an air stream to heat the air of such stream, and which has a number of advantages and improved characteristics as compared to burners previously available for air stream applications, including such advantages and characteristics as the following:

(1) Increased capacity with clean, intense, and complete combustion, and short flame length, over a range of heat inputs (for a given size burner) extending substantially above that available from prior burners. For example, where prior line burners in air stream operation have a maximum output not exceeding 200,000 B.t.u. per hour per lineal foot of burner, when operating in a restricted range of air velocities of 500 to 1,500 feet per minute, outputs of our new burner run up to and beyond 500,000 B.t.u. per hour per foot, in air velocities ranging up to 4,000 feet per minute.

(2) Positive flame retention and stable combustion at higher heat inputs and in higher velocity air streams. For example, where prior line burners even for limited outputs require air velocities to be held at or below 1,500 feet per minute and fuel mixture pressures to be held within restricted limits, to avoid flame loss, our new burners avoid these limitations and operate satisfactorily at higher and wider ranges of outputs in air velocities from 1,500 to 4,000 feet per minute. In contrast to prior burners, the output of our burners is not limited by danger of flame loss.

(3) Utilization of the air stream to supply large proportions or all of the air required for combustion, and to produce intermixing of air and gas, which substantially reduces the amount, complexity, and cost of air supply means otherwise required.

(4) Operating flexibility, that is, ability to operate satisfactorily over a substantial range or variation of operating conditions, and consequent high tolerance for different air velocities, for turbulence, and for non-uniformity in the air stream, and high tolerance for variations in air-fuel ratios and in B.t.u. content of the gases used.

(5) A high turn-down ratio, and ability to be throttled or adjusted with smooth continuous variation of heat output over a broad range of operation. Thus, where prior air-stream burners had turn-down ratios not exceeding 10-to-1 and greater turn-down requirements could be met only by expensive multiple systems giving uneven control, our new burners have turn-down ratios running well beyond 25-to-1 and give smooth and continuous control over the whole range.

(6) Various other and additional advantages as will appear from the description of the invention and burner apparatus embodying the same.

Apparatus is known for supplying gas burning equipment with pre-mixed gas and air and for controlling and adjusting both the amount of mixture and the proportions of air and gas supplied, as of the type shown in Patents Nos. 2,035,904 and 2,286,173. We may use such control and adjusting apparatus to supply different gas-air fuel mixtures for different stages of operation of our new burners in high turn-down installations.

In accordance with the invention, a gas burner may comprise an open-faced combustion and mixing space in which a standing pattern or array of spaced air jets is provided adjacent a gas supply means and extending laterally therefrom, preferably with near jets of relatively small capacity and relatively widely spaced and with more remote jets of greater capacity and less widely spaced, and desirably with the jets directed at a converging angle with respect to the direction of gas discharge. The air jets induce reduced pressure in the spaces or passageways between the jets of the standing pattern, which draws gas into and through such spaces and passageway and into admixture with air of the jets to form a rapidly and completely combustible mixture which will burn about the jets and in the said combustion space, the combustion extending to and involving a greater or lesser portion of the air jets pattern depending upon the amount of gas supplied. Preferably, the air jets are formed at opposite sides of the gas supply means and are arranged to converge or interlace in the space toward which the gas supply means discharges. The air jets may thus form a converging curtain or canopy over the gas supply to ensure thorough mixing and heating and combustion of all the gas supplied at all rates of operation.

The gas supply means desirably comprises one or more gas ports in a nozzle of along a manifold, and this is desirably flanked by one or more mixing walls or plates having a pattern of air openings at which air jets are caused to form by a suitably induced pressure differential across the mixing wall or walls. A symmetrical arrangement of mixing walls is preferably used, as by disposing walls at opposite sides of the gas supply means. The air jets may be directed into convergence with the gas flow and each other by disposing opposite mixing walls in facing divergent relation in the direction of gas flow and disposing the air openings in converging directions through the divergent mixing walls.

In air stream applications, one or more mixing walls or plates is positioned to present one side thereof to the air flow in the air stream and to set off or define a mixing area and combustion space on the downstream side thereof in which the air stream flow induces a reduced pressure or partial vacuum. The walls are provided with air-admitting openings, preferably associated with air-directing means, through which the air jets are caused to issue by reason of the impingement of the higher pressure air stream at the back of the walls and the presence of the reduced pressure at the front face of the walls. The burner thus utilizes the air stream itself both to provide the operating pressure conditions and to supply the air for the air jets and the combustion which occurs therewith.

The mixing walls preferably lie oblique to the air flow path and, as shown in the accompanying drawings, desirably diverge at an included angle of 50°. Such walls set off a combustion space which is open in the direction of air stream flow and which is desirably of progressively increasing cross-sectional area in such direction. The pattern of spaced air-admitting openings in such wall or walls is desirably of progressively increasing area in the direction of increasing cross-section of the combustion chamber, and the web areas between the openings and underlying the passageways between the air jets are desirably wider at the inner portion of the walls, so that the gas passageways are of larger capacity in such inner portion.

Combustion chambers may be of various cross-sectional shapes. For example, the burner may have a conical or pyramidal combustion chamber of circular, rectangular, or other cross-section. In line burners the combustion chamber is preferably a deep wedge-shaped trough formed by diverging side walls having spaced rows of spaced openings formed therein. Desirably, the openings at the bottom or innermost portion of the trough are smaller and more widely spaced while the outer rows are larger and have less walls area between them. The air openings are less than sufficient to satisfy the vacuum produced within the mixing chamber, e.g. the trough, by the air flow, and are spaced sufficiently to provide adequate gas flow passages between the air jets issuing through such openings. The height of the walls and the number of rows of openings may differ for different burner capacities and different ranges of turn-down ratio.

Baffles or deflectors are desirably provided outside the air openings to deflect air therethrough from the air stream and to direct the air jets inward from the face of the mixing wall. These can be formed in any suitable way, depending on the material used. In sheet metal mixing plates, the deflectors are desirably provided by bending or deforming portions of the sheet metal outward from the mixing wall to form the air openings and leaving such portions in out-standing position as in the form of tongues at the downstream edges of the openings.

The nozzles, manifolds, mixing plates or walls, and other parts of the burner may be made from any suitable material or materials, such for example, as heat-resistant sheet-metal, coated metals, ceramics, and other materials capable of withstanding the temperatures and other operating conditions of the particular installations for which the burners are intended.

The fuel supply means for the burner preferably introduces gaseous fuel (gas-air mixtures or raw gas) into the mixing chamber at its closed upstream end, i.e. at the bottom of the trough of a line burner. Some of such gas will intermix with the converging or inter-lacing air jets. Other portions of the gas will be drawn into and along the low-pressure passageways between the air jets and is drawn therefrom into admixture with the air of such jets, to burn rapidly and cleanly in intense flame at the surfaces of the jets and between them. The number of jets at which flame appears and the amount of flame in the combustion chamber will vary with the amount of gas supplied. By varying the amount of gas or gas-air fuel mixture supplied to the burner, and desirably varying also the proportion of gas in the gas-air mixtures used, the rate of operation and the heat output can be smoothly and continuously varied over a substantial range running upward to very high outputs.

In a wide turn-down ratio burner embodying the invention, the fuel supply means combined with the mixing walls and combustion chamber described above is desirably in the form of a burner element which in combination with the parts described above will itself operate over a range of low input rates, with the mixing walls serving, during low fire conditions, to protect the low fire from the air stream and, at higher rates, to provide the high capacity and complete combustion as described above. To this end, the gas discharge means at the bottom or base of the mixing chamber is desirably in the form of one or more main gas ports, flanked by shielded eddy pockets supplied by supplementary or ignitor gas ports which may be of smaller capacity than the main gas ports.

In a wide turn-down ratio burner, such as a line burner, the various stages and variations of operation may be as follows:

For minimum and low rates of operation, the burner ports may be supplied with a combustible mixture of gas and air containing all or substantially all the air required for combustion, and at a low rate sufficient to avoid flash back. Under such supply conditions, only a low fire will be produced, such as small flame cones at the main burner ports, and such low fire will be contained in the bottom of the mixing trough, below at least most of the air jets, and will be protected from the high velocity air stream by the mixing walls. For progressively higher stages of operation, the amount of fuel mixture supplied is progressively increased. As this occurs, the fuel jets issuing from the main ports will reach a velocity at which flame retention might be lost if such main ports stood alone; but the gas supplied through the ignitor ports to the shielded eddy pockets alongside the main ports will be slowed and will maintain stable ignitor flame at the base of the gas jets from the main ports, and will constantly ignite those main gas jets. The low-capacity element of a line burner embodying the features described might itself be operated, in a typical case, at a minimum of about 12,000 to 15,000 B.t.u. per lineal foot per hour and upward therefrom over a considerable range, with stable flame and no danger of flame loss.

However, as the supply rate of air-gas mixture is increased in the high turn-down ratio burner, to increase the operating rate, the gas-air mixture supplied to the burner is desirably progressively enriched by increasing the proportion of gas therein. With such richer mixtures, while flame may continue at the main gas ports, unburned gas will flow therefrom to the low-pressure passageways between the air jets and will be drawn into the jets and burned with air from such jets. As this action progressively occurs, flame streaks or cones will progressively appear at the innermost air openings.

For still higher-rate operation, the amount of air-gas mixture and the proportion of gas therein are further progressively increased. With such increase, the appearance of flames associated with the main gas ports of the low-rate element becomes progressively less clear, and a stage is reached at which the main and supplementary gas ports combine to serve wholly as gas supply passages rather than as burner nozzles, and to fill the bottom of the combustion trough with unburned gas mixture. While such gas mixture may still have substantial velocity toward the open face of the burner and part of it will mix and burn with the converging air jets, much or most of it will be drawn laterally to the faces of the mixing plates and there into and along the low-pressure passageways around and between the air jets. The induction effect of the air jets will cause thorough mixing of the gas with air from the air jets, and combustion will take place mainly about such jets and in the space to which they discharge, with well defined flame cones appearing at the air openings. As the supply of fuel is still further increased and richened—or changed to raw gas—flame will appear at more air jets and at jets farther toward the open mouth of the trough, and the flame may fill the trough to an increasing extent and stand outward from its mouth. This operation, in a typical line burner embodying the invention may give outputs ranging upward to 500,000 B.t.u. per lineal foot per hour. Since the same burner at the low-rate operation described above has an output of 12,000 to 15,000 B.t.u. per foot per hour, the burner gives a turn-down ratio well above 25-to-1.

Moreover, the burner combination operates at any B.t.u. input in the entire range of operating rates with considerable variation in gas-to-air proportions in the fuel mixture supplied; and this is especially so, and especially advantageous, at upper-stages of operation. Thus in operation at high capacities, the fuel mixture supplied to the burner can vary from raw fuel gas to a pre-mixed gas-air mixture containing large proportions, say up to 50%, of the air required for combustion. Clean combustion can be obtained at any desired B.t.u. output with a considerable variation of air-fuel ratios and operating conditions and without need for critical adjustment. The burner utilizes the flow of the air stream to produce complete intermixing of all the gas with air, and this action is self-regulating and automatically compensates for variations in supply rates and richness or leanness of fuel mixtures and air mixtures.

With such flexible and self-compensating operation at any point in the operating range, it is readily possible to throttle the burner over a broad range of heats inputs and to obtain continuous smooth variation in output over the entire broad range of operation.

The accompanying drawings illustrate the invention. In such drawings:

FIG. 1 is a somewhat diagrammatic sectional view of an air-heating installation using a line burner assembly embodying the invention, with the burner supplied from a pre-mixing blower and proportioning valve, which installation may be considered a fresh air application by assuming the incoming air to be fresh air, or a recirculating oven atmosphere application by assuming the air stream to be part of a recirculation stream.

FIG. 2 is a somewhat diagrammatic section taken on the line 2—2 of FIG. 1, showing a front elevation of the line burner assembly;

FIG. 3 is a sectional view of a burner embodying both the high capacity and high turn-down aspects of the invention, taken on the line 3—3 of FIG. 2;

FIG. 4 is a diagrammatic view showing the apparatus of FIGS. 1–2 in a fresh air application;

Figure 10:
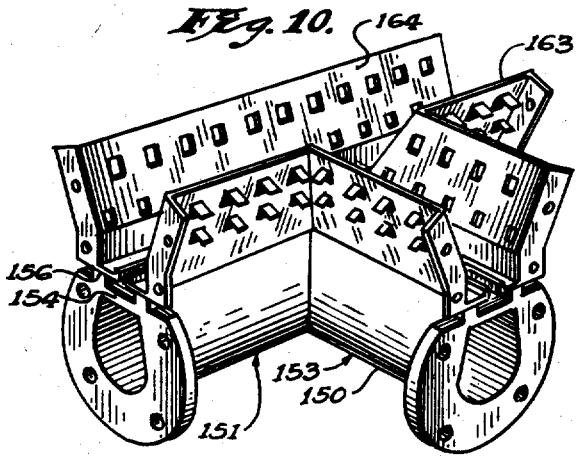
Figure 9:
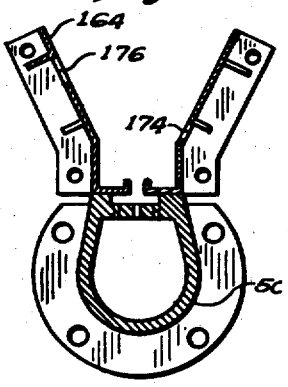
Figure 6:
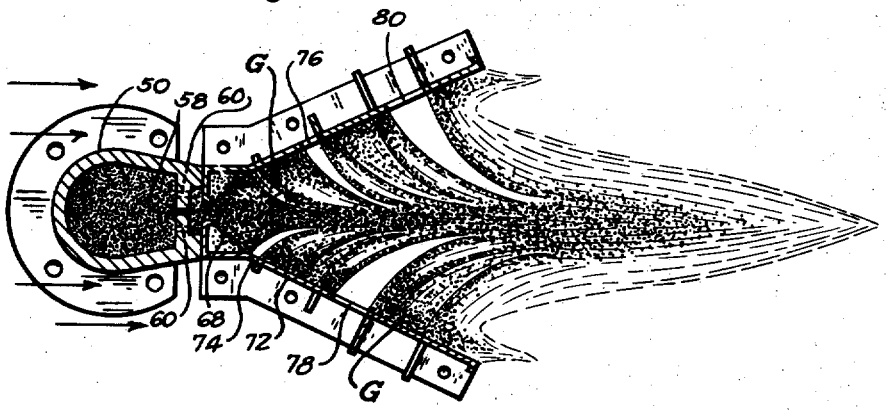
Figure 7:
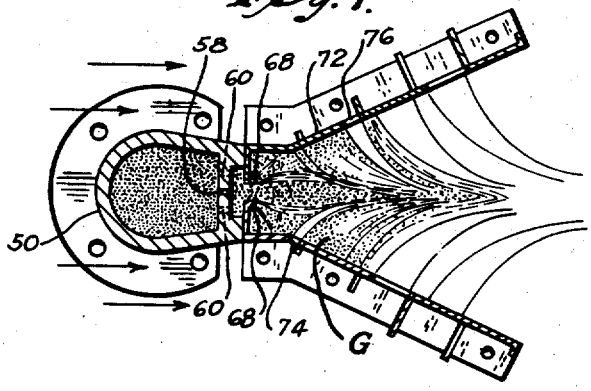
Figure 8:
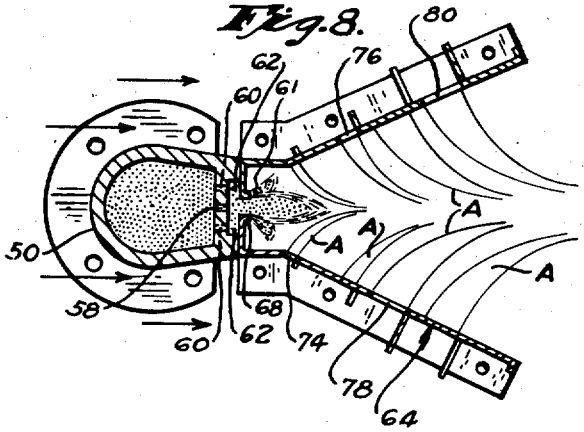

FIGS. 6, 7, and 8 are sectional views similar to FIG. 3, in which high, intermediate, and lower stages of operation are indicated;

FIG. 9 is a cross-sectional view similar to that of FIG. 3, showing a modified burner unit having mixing walls of reduced height; and FIG. 10 is a pictorial view of a T-shaped burner section embodying the invention, and provided with relatively short side walls as in FIG. 9.

The air-heating apparatus shown in FIG. 1 is illustrative of arrangements in which an air stream flowing through a duct 14 is heated by a line burner assembly 20. The air stream may be either a fresh air stream, as where the duct 14 is one connected to a fresh air inlet grill 13 as shown in FIG. 4; or the air stream may be a recirculating stream, as where the duct 14 is part of the recirculating duct work of an industrial oven or the like. The air stream will be propelled through the duct 14 by a suitable blower such as the blower 15 shown in FIG. 4, and in different installations the burner 20 may be either on the upstream or suction side of the blower or on the downstream or pressure side of the blower.

In the arrangement shown in FIG. 1, a gas burner assembly 20 is arranged transversely of the duct 14 and is connected to a supply line 22 leading from a blower-mixer 24 of the type shown in U.S. Patent No. 2,035,904. Such mixer has a gas inlet pipe 23 and an air inlet shutter 25, and is arranged not only to supply regulated amounts of gas-air mixture, but also to control the proportions of gas and air in the mixture and to provide different proportions in the mixture at different rates of mixture supply. The gas-air proportions are controlled by suitable fixed adjustments in the mixer 24, and the rate of mixture supply is controlled by a controller 26 responsive to a thermostat 27 positioned at a suitable control point in the air system.

As indicated in FIG. 2, the burner assembly 20 is made up of line burner elements or units forming a pattern which is distributed transversely across the area of the duct 14. The heating flame occurs in a substantially continuous line along the length of each burner unit, and the assembly shown distributes the flame and heat in a desirable pattern across the whole air stream. Several shapes of the burner units may be used to form burner assemblies. In the assembly shown, the center unit is a cross-shaped unit 30, provided with bottom inlet 32 for connection to the supply line 22. The upper and lower arms of the cross unit 30 are connected to straight units 34, and these are connected to T-shaped units 36. The horizontal arms of the center cross unit 30 are connected to similar cross units 38, having no bottom inlets, and the upper and lower arms of each such cross unit 38 are connected to straight units 34. The free ends of the burner units are closed by suitable end plates 40.

Figure 5:
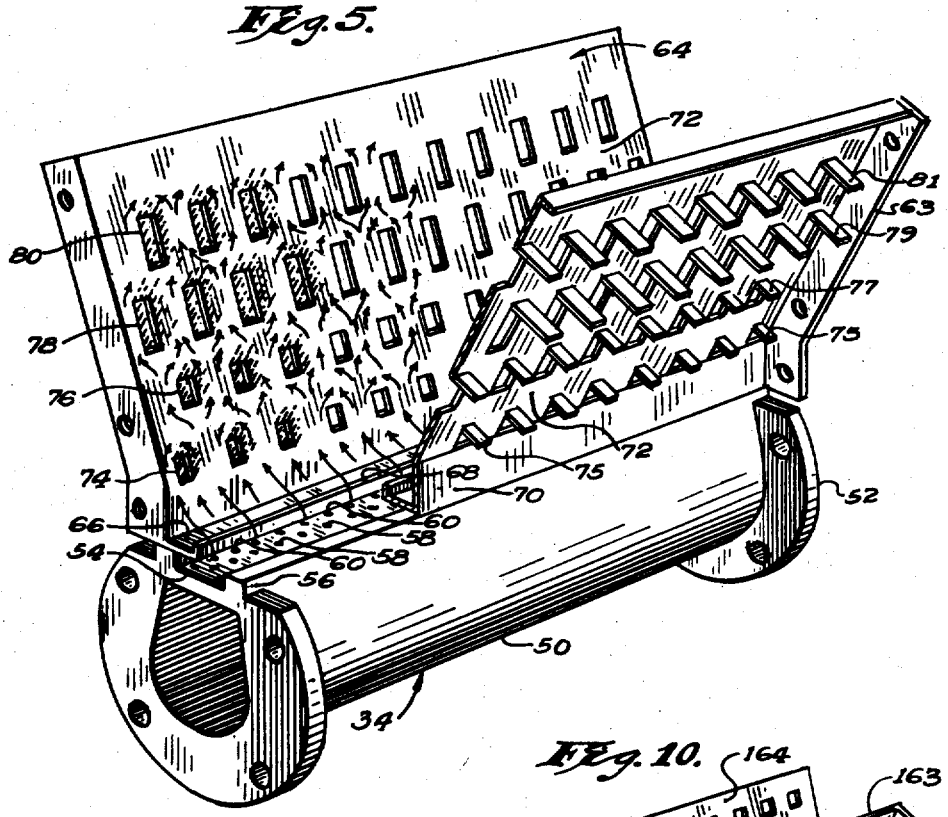
FIG. 5 is a pictorial view of a burner unit as shown in FIG. 3, with parts broken away for clarity, and with air and gas flow indicated thereon.

FIGS. 3 and 5 show details of the burner units, as embodied in a straight unit 34. The burner unit comprises a manifold section 50 forming a gas conduit, and having attachment flanges 52 at its ends. At one side, here shown at the top, the manifold section 50 is formed as a flat wall 54; having a longitudinal ridge or rail 56 along each edge. The other walls are desirably rounded to present a streamlined shape to the air stream. A row of main burner ports 58 is arranged longitudinally along the center of the flat wall 54. Two rows of supplemental or ignitor ports 60 are formed in the flat wall 54, between the row of main burner ports 58 and the rails 56. Such ignitor ports 60 may be of smaller size than the main ports 58, and are desirably positioned in staggered relation with the main ports 58. A shielding and mixing plate or wall 64 is mounted on each longitudinal ridge 56. Each such plate 64 comprises a flat bottom wall 66 resting on the ridge 56 and extending inward therefrom, with an up-turned lip or flange 68 at its inner edge.

Such bottom walls 66 desirably extend inward beyond the ignitor ports 60 but short of the main ports 58. Their lips 68 are spaced from each other to form a slot through which the main ports 58 are exposed and through which the gas jets fom the ports 58 may pass. The ridges 56 and the inward extending parts of the walls 66 form eddy pockets 62 at opposite sides of the gas jets from the main ports 58, at the base of those jets.

From the outer edge of the bottom wall 66, the shield 64 extends straight upward to form a flame shield 70, and from the upper end of such shield extends obliquely outward to form a mixing wall 72. Each mixing wall 72 contains a plurality of rows of spaced air-admitting apertures, desirably of progressively increasing size and in staggered relation. As shown, the mixing wall 72 contains a bottom row of relatively small apertures 74, a second row of intermediate sized apertures 76, and third and fourth rows of larger apertures 78 and 80. Various forms of apertures can be used. In the preferred form shown, each aperture is rectangular and is formed by striking outward from the mixing wall a tongue of metal, and such tongues are desirably left as outward projections, standing substantially normal to the wall 72, to deflect air through the apertures from the air stream in which the burner is located. On the outer face of the mixing wall, therefore, there are a series of small tongues 75 at the upper edge of the small apertures 74, and similar tongues 77, 79, and 81 at the upper edges of the apertures 76, 18, and 80. The four rows of tongues extend progressively farther outward into the air stream, both by reason of the oblique position of the wall 72 with respect to the air stream and by reason of their progressively greater lengths. The ends of the plates 64 are desirably provided with stiffening flanges 63 through which bolts or rivets may be passed to interconnect the plates of adjacent burner sections.

The burner shown in FIG. 3 may operate in any desired position. Thus, it may face upward as shown in FIG. 3, or it may face horizontally, either with its longitudinal axis vertical as in the vertical sections of the burner assembly shown in FIG. 2, or with its longitudinal axis horizontal and with its gas ports 58 disposed in a horizontal plane as in the horizontal portions of the burner assembly shown in FIG. 2. In any case, the burner unit will be disposed in a fast-moving air stream, which may be flowing at velocities of 1,500 to 4,000 feet per minute. The air flow will be in the direction indicated by the arrows appearing in FIGS. 1 and 3. The air will approach the burner unit from the back side of the manifold 50 and will flow along the side walls of such manifold and forward along the outer faces of the shielding and mixing plates 64. The open mouth 65 of the mixing trough and combustion chamber formed by the plates 64 will face downstream in the direction of air flow. Air stream flow past the burner will create a low pressure or vacuum in the mixing trough of the burner. Such vacuum, plus the ram effect of the air at the apertures 74, 76, 78, and 80, and the deflection of air thereto by the tongues 75, 77, 79, and 81, will cause jets of air to issue obliquely inward from the apertures, as indicated by dotted lines in FIG. 5. These jets will be insufficient to satisfy the vacuum within the mixing chamber; moreover they will themselves induce low pressure in the areas around and between the jets and adjacent the inner faces of the mixing wall 72. These low pressure areas between the jets will provide flow paths into which gas issuing from the manifold will be drawn and along which gas will flow when the gas is not completely consumed in flames at the gas ports and unburned gas is present in sufficient quantities to permit that flow to occur. The gas flow in such low pressure areas, as indicated by the arrows in FIG. 5 can carry gas to all the air jets issuing through the mixing wall 64.

With these conditions of air flow and pressure, a wide variety of operating conditions can be obtained under relatively simple regulation of the amount and character of fuel gas mixture supplied through the manifold.

FIGS. 6, 7, and 8 illustrate three stages of operation. In such figures, the air jets A are shown in full lines, unburned or incompletely burned gas G is indicated by stippling, and flame is indicated by dotted lines. At all stages, a pattern of air jets A will stand inward from the air apertures 74, 76, 78, and 80, to be involved in combustion to a greater or lesser extent depending on the gas supply rate.

For the high fire operation indicated in FIG. 6, the manifold 50 carries either raw gas or a rich gas-air mixture, containing up to say 20% of the air required for combustion. The gas supply rate will be high, as at a pressure of 6 inches of water column, and the gas ports 58 and 60 will serve in common to supply gas to and through the slot between the lips 68 at the bottom of the mixing trough. Part of the gas will flow centrally into admixture with the converging air jets, as indicated by the central stippled area at the base of the trough. Substantial other portions of the gas will flow laterally toward the mixing walls 72, its velocity will be reduced and it will be drawn toward the mixing walls 72 by reason of the low pressure areas existing adjacent those walls and in the spaces between the air jets A issuing from the apertures 74–80. The gas will flow in the low pressure flow paths (as indicated by arrows in FIG. 5) to surround such air jets and to mix with them. As a result, a mass of flame will occur in the mixing trough and projecting therefrom, as generally indicated in FIG. 6. The gas mixing with the air jets will burn at the surfaces of the jets to form distinct flame streaks standing inward from the air openings 74–80, at the surfaces of the air jets, and further combustion will occur between and around the jets. The central portion of the mixing trough will be filled with a mass of burning gases, which flame may project some distance from the open mouth of the burner trough, say up to two or three times the width of the open mouth of the trough. The combustion is intense and clean, and the flame is firmly seated and anchored in the burner trough, with no tendency to drift or blow away from the burner. This stage of operation provides very high rates of heat input into the air stream in which the burner is operated.

At the low stage of operation indicated in FIG. 8, the combustion is substantially independent of the air jets issuing through the air openings 74–80; but the air jets serve to carry the products of combustion into the admixture with the air stream, the mixing trough provides desirable pressure conditions about the flame, and the side plates 64 of the burner assembly serve effectively to shield the flame from the fast-moving air stream. For this low stage of operation the gas-air mixture supplied to the manifold 50 desirably contains all or substantially all of the air required for combustion, say 80 or 90% of the combustion air. The air-gas mixture is supplied at relatively low pressure, as of the order of one-half to one-fourth inch of water column. Under these conditions, the fuel mixture issuing through the main ports 58 forms distinct flame cones 59 at each of the main ports 58. Such cones will be closely embraced by the lips 68 which form eddy pockets 62 along both sides of the row of gas jets from the main ports 58. The gas issuing from the ignitor ports 60 will be slowed in the eddy pockets 62 and will burn in tongues of flame 61 which fill the slot formed by the lips 68 at points between the main flame cones 59. These ignitor flames 61 will be maintained at the base of the fuel jets issuing from the main ports 58, and will constantly ignite those main jets and will ensure flame retention.

The rate of combustion in this low stage of operation may be adjusted over a considerable range. At a minimum, the flame may consist of a short continuous line of flame along the slot between the lips 68, with only small enlargements appearing at the main ports 58. At higher rates, the flame cones 59 at the main ports 58 may extend a substantial distance outward in the trough of the burner assembly. The jet velocity from the main ports may be well beyond that at which flame could otherwise be retained, but the eddy pocket construction and the ignitor flame at the base of such jets will constantly ignite them and maintain stable combustion.

At intermediate stages of operation, low-stage and high-stage conditions smoothly merge with each other in varying amounts. A typical intermediate stage of operation is shown in FIG. 7 to illustrate such merging. The manifold is supplied with an air-gas mixture containing 50 to 60% of the total air required for combustion. The jets of gas-air mixture from the main ports 58 are of high velocity, but are continuously ignited by ignitor flames opposite the ignitor ports 60 at the lips 68, and distinct central flame cones appear opposite each main port 58. Less than all of the fuel is consumed in these flames, and combustible gas flows to the low pressure areas between the air jets issuing from the apertures in the mixing walls 72, and is drawn into such jets and burned with air from them. Distinct flame cones appear at the innermost air openings 74, and partial flame cones appear at the air openings 76.

As the amount and richness of the gas-air mixture is increased from the conditions of FIG. 7, combustion will progressively change toward the high stage of operation shown in FIG. 6, with progressively less flame in the bottom of the trough and with more at and about the air jets. As the amount and richness of the air-gas mixture is decreased from the intermediate stage of FIG. 7, the character of operation will approach that of FIG. 8.

While different stages of operation have been illustrated and described, these are but points in a smoothly and continuously adjustable range of operation from minimum to maximum. The burner is preferably used with a proportioning control device which regulates the total supply of admixed gas and primary air, and which will also vary the proportion of air mixed with the fuel gas, such as a control device of the type shown in U.S. Patent No. 2,286,173. With a control of this type, the burner can be smoothly throttled over the whole range of operation from the very high rate of maximum high-stage operation down to the lowest rate of low-stage operation.

FIG. 9 shows a burner unit which may be used where a lower maximum B.t.u. input is required than that provided by the unit of FIGS. 3 and 5. The manifold 50 of the unit in FIG. 9 is identical with the manifold of the unit of FIG. 3, save that the gas ports may be of smaller size. The side plates 164 of the burner are identical with the plates 64 shown in FIGS. 3 and 5 and described above, save that they are only half as high and contain only two rows of air apertures 174 and 176, instead of the four rows shown in FIG. 3.

FIG. 10 shows a T-shaped section equipped with mixing plates of the same height as those in FIG. 9. The arms of the T-shaped manifold 150 have the same cross-sectional configuration as shown in FIGS. 3 and 9, with a flat wall 154 containing longitudinal rows of main and ignitor gas ports, and having longitudinal ridges or rails 156 along its edges. The cross arm 151 of the T-shaped unit carries at one side a straight side plate 164 like that shown in FIG. 9. The adjoining rails 156 of the cross arm 151 and the center arm 153 carry side plates 163 which in cross-section are the same as shown in FIG. 9 but which are L-shaped in plan. These form wedge-shaped troughs, above the arms of the T-shaped unit, of the same configuration as in FIG. 9, and in open communication with each other.

FIG. 10 illustrates elements which are used in the construction of cross-shaped and T-shaped burner sections such as those of the burner assembly shown in FIG. 2. It will be understood that such burner sections may be equipped either with full-height side plates as shown in FIG. 3 or with the half-height side plates shown in FIGS. 9 and 10.

In the drawings illustrating the invention, it will be noted that certain relationships are shown. Referring, for example, to the preferred modification shown in FIGS. 1, 2, 3 and 5, the mixing plates 64 define at their forward edges a discharge opening or mouth 65 for the mixing space of the burner which is substantially coextensive with the frontal area of the burner. As shown in FIG. 2, such discharge opening of the burner 20 lies within the cross section of the air stream passage defined by the duct 14, leaving a surrounding open area of the air stream passage which is larger and of greater capacity than such discharge opening. By measurement, FIG. 2 shows an open air stream passage within the duct 14 greater than the frontal area of the burner 20.

In FIGS. 3 and 5, it may be noted that the area of each mixing wall 72, extending obliquely outward from the straight flame shield 70, is shorter and of smaller area than the width and area of the open mouth 65 between the outer edges of the mixing walls 72—the top edges in FIG. 3—and hence of less area than such open mouth 65 or discharge area defined between such outer edges. Further, it is clear that the various apertures 74, 76, 78 and 80 in such mixing walls 72 are of substantially smaller area than the wall portions between them, and from this it is evident that the apertures provide a total inlet area to the mixing space which is substantially smaller and of less capacity than the discharge area of such open mouth 65. Further, in the duct installation shown in FIGS. 1 and 2 the mixing space inlet area, being smaller than the burner outlet area, is also smaller and of less capacity than the air stream passage provided by the surrounding open duct area. Similar relationships are present in the other modifications shown in the drawings.

We claim as our invention:

1. A high turn-down gas burner adapted for operation in an air stream flowing forwardly past the burner at a velocity of the order of 1500 to 4000 feet per minute, comprising an elongated burner body defining a fuel gas supply passage and having an elongated forward wall to lie transversely of the direction of the air stream, said wall having gas port means at a series of points along its length, flame shielding walls extending forward from adjacent the sides of the body in spaced relation along opposite sides of said gas port means, defining a low-flame zone in front of said gas port means, mixing plate walls extending obliquely forward and outward from said shielding walls in divergent relation at an included angle of the order of 50°, said walls defining a forwardly widening trough-shaped mixing space forwardly of said gas port means, said mixing space being forwardly wide open for free and open discharge communication with the passing air stream, said mixing plate walls projecting laterally of said burner body with their back faces positioned to lie exposed to the air stream flowing past the burner, a plurality of apertures in said mixing plate walls spaced both longitudinally thereof and at different distances from said burner body, said apertures being smaller than the wall areas between the same and having a total area substantially less than the forward open discharge area of said mixing space, the inner apertures being of smaller capacity than the outer apertures, air deflector means projecting obliquely outward and rearward into the path of the passing air stream from adjacent the down stream edges of said apertures, said burner body and divergent walls being shaped to divide and outwardly deflect the air stream flowing past the burner and cause such flow to create reduced pressure in said mixing space, and said apertures and deflector means being positioned and arranged to admit and direct air from such passing air stream into the mixing space in distinct jets flowing obliquely forward and inward in said mixing space in front of said low-flame zone, said gas port means being operable to discharge variable amounts of fuel gas from said burner body to said low-flame zone and mixing space whereby to provide low flame combustion in said zone and progressively higher flame combustion involving progressively more of the spaced air jets in said mixing space.

2. Air stream heating means having a high turn-down ratio, comprising an elongated burner body defining a gas supply passage and having a forward wall, gas port means at a series of points along said forward wall including high and low velocity gas ports and forming a variable-rate gas burner when supplied with varied amounts of combustible air-fuel mixtures, means for forming an air stream flowing forwardly past the burner at a velocity of the order of 1500 to 4000 feet per minute, shielding walls extending forward from said body on opposite sides of said gas port means and shielding the same from the passing air stream, mixing plates extending divergently forward and outward from said shielding walls at an included angle of the order of 50°, defining a trough-shaped mixing space in front of said variable rate burner, said mixing plates being exposed to the passing air stream and arranged to cause the same to produce reduced pressure in said mixing space, means including spaced apertures in said mixing plates to cause a standing array of spaced jets of air from said passing air stream to issue inward and forward in converging relation in said mixing space forwardly of said variable rate gas burner, and supply means to supply controlled amounts of air and fuel gas to said gas supply passage for discharge from said gas port means, said supply means at low rate deliveries supplying a substantially combustible air fuel mixture for shielded combustion at said port means, and at higher rate deliveries supplying progressively richer gas mixtures to progressively involve in combustion the standing array of air jets in said mixing space whereby said burner may be adjusted in operation from a high rate involving combustion at substantially all said air jets down to a low rate of combustion at said port means and inward of said array of air jets.

3. A high turn-down ratio gas burner for operation in and for heating a low-pressure air stream flowing forward past the burner at a velocity of the order of 1500 to 4000 feet per minute, comprising in combination, an elongated burner body having means for connection to a supply of gas-air mixtures and defining a feed passage and having a forward wall, means including gas port means connected to said passage for forming along said forward wall a variable low-rate burner for variable low-rate combustion of combustible air-gas mixtures independently of air from the passing air stream and operable over a substantial turn-down range when supplied at varied rates with combustible air-gas mixtures, shielding wall means connected to said burner body and extending forward in laterally spaced relation from opposite sides of said variable low-rate burner, said wall means defining in front of said variable low-rate burner a shielded zone in which said variable low-rate combustion can take place independently of and shielded from the passing air stream and in which at higher combustion rates fuel gas can flow flow forwardly from said gas port means, mixing plates extending obliquely forward and outward from said shielding walls in widely divergent relation and defining at the front thereof a forwardly widening mixing space in open receptive communication with said shielded zone and having an open discharge at its forward end, said mixing plates being arranged for exposure to the air stream and for shielding said mixing space therefrom, means including a plurality of spaced rows of spaced apertures in said mixing plates for admitting jets of limited quantities of air from the passing air stream into said mixing space, said aperture-including means and the angular position of said mixing plates being arranged to cause said jets to stand in forwardly converging arrays of spaced jets, said apertures being of limited capacity and having a total area substantially less than the forward open discharge end of the mixing space between the plates, the apertures at the inner portion of the mixing space, adjacent said shielded zone, being relatively small and being proportioned to cooperate with said variable low-rate burner to provide air for progressively increased combustion, in said zone and inner mixing-space portion, of gas-rich air-fuel mixtures supplied through said port means, the apertures at outer portions of said mixing space being larger and being proportioned to supply additional air for progressively higher rate combustion in said mixing space of gas-rich fuel supplied thereto through said port means and said low-rate zone, whereby said burner may be adjusted in operation from a high rate involving combustion at substantially all said air jets, through substantially continuous variation, down to a low rate of combustion at said low-rate burner inwardly of said air jets.

4. Air stream heating apparatus according to claim 3 in which said mixing plates lie at an included angle of the order of 50 degrees, said angled position serving to promote the action of the passing air stream in producing reducing pressure and converging air jets in said mixing space and to promote cool operation of the mixing walls.

5. Air stream heating apparatus according to claim 3 with the addition of deflector means standing outward into the passing air stream from adjacent the forward edges of the apertures for directing and increasing the force of the air jets produced in the mixing space by the flow of the air stream against and past the burner.

6. A high turn-down ratio gas burner as defined in claim 3 in which said gas port means comprises central main gas ports at a series of points along said forward wall and supplemental gas port means in flanking relation with said main gas port means, and said low-rate burner comprises flange means in spaced overlying relation with said supplemental gas port means and defining a flame-retention opening aligned with said main gas port means and offset from said supplemental gas port means, and said shielding wall means comprises opposite walls extending forward from points spaced laterally from said flame-retention opening.

7. A high turn-down ratio gas burner for operation in and for heating a low-pressure air stream flowing forward past the burner at a velocity of the order of 1500 to 4000 feet per minute, comprising in combination, a burner body having means for connection to a supply of gas-air mixtures and having forward gas port means and flame-retention means cooperating therewith to form a variable low-rate burner for variable low-rate combustion of combustible air-gas mixtures independently of air from the passing air stream and operable over a substantial turn-down range when supplied at varied rates with combustible air-gas mixtures, shielding wall means connected to said burner body and extending forward in spaced relation to define in front of said variable low-rate burner a shielded zone in which said variable low-rate combustion can take place independently of and shielded from the passing air stream and in which at higher combustion rates fuel gas can flow forwardly from said gas port means, mixing plates extending obliquely forward and outward from said shielding walls in widely divergent relation and defining at the front thereof a forwardly widening mixing space in open receptive communication with said shielded zone and having an open discharge at its forward end, said mixing plates being arranged for exposure to the air stream and for shielding said mixing space therefrom, means including a plurality of spaced rows of spaced apertures in said mixing plates for admitting jets of limited quantities of air from the passing air stream into said mixing space, said aperture-including means and the angular position of said mixing plants being arranged to cause said jets to stand in spaced forwardly converging relation, said apertures being of limited capacity and having a total area substantially less than the forward open discharge end of the mixing space between the plates, the apertures at the inner portion of the mixing space, adjacent said shielded zone, being relatively small and being proportioned to cooperate with said variable low-rate burner to provide air for progressively increased combustion, in said zone and inner mixing-space portion, of gas-rich air-fuel mixtures supplied through said port means, the apertures at outer portions of said mixing space being larger and being proportioned to supply additional air for progressively higher rate combustion in said mixing space of gas-rich fuel supplied thereto through said port means and said low-rate zone, whereby said burner may be adjusted in operation from a high rate involving combustion at substantially all said air jets, through substantially continuous variation, down to a low rate of combustion at said low-rate burner inwardly of said air jets.

8. A high turn-down ratio burner according to claim 7, in combination with supply means to supply controlled amounts and proportions of air and fuel gas to said burner-body feed passage for discharge from said port means, said supply means being constructed and arranged to supply low-rate deliveries of substantially combustible air-fuel mixtures for shielded combustion in said low-rate zone independently of air from the passing air stream, to supply progressively increased intermediate-rate deliveries of progressively gas-enriched air-fuel mixtures for progressive intermediate-rate combustion in said low-rate zone and with air from said small apertures, and to supply progressively higher rate deliveries of still higher gas-content fuel mixtures for progressive higher rate combustion with air from said larger apertures.

9. A high turn-down gas burner as defined in claim 7 in which said gas port means includes means to provide high-velocity gas jets and means to provide low-velocity gas supply at the base of said high velocity jets, said low velocity gas supply means serving at intermediate combustion rates to provide ignition flame for said high-velocity jets and at higher combustion rates to supplement the capacity of the gas port means to supply gas for combustion with said air jets.

10. Air stream heating apparatus, comprising a high turn-down ratio gas burner as set forth in claim 7 in combination with duct means forming a low-pressure air stream passage about and past said burner, and air propelling means for causing low-pressure air to flow forwardly in said passage at a velocity of the order of 1500 to 4000 feet per minute past said burner, the mixing plates of the burner being positioned to be impinged by said air stream and defining at their forward edges a cross-sectional outlet area at which said mixing space discharges into confluence with the passing air stream, said outlet area lying within the cross-sectional area of the air stream passage and being surrounded by an open air stream passage area of larger capacity than said apertures.

*11. A high turn-down gas burner adapted for operation in an air stream flowing forwardly past the burner at a velocity of the order of 1500 to 4000 feet per minute, comprising an elongated burner body defining a gas fuel supply passage and having an elongated forward wall to lie transversely of the direction of the air stream, said wall having gas port means at a series of points along its length, flame shielding walls extending forward from adjacent the sides of the body in spaced relation along opposite sides of said gas port means, defining a low-flame zone in front of said gas port means, mixing plate walls extending obliquely forward and outward from said shielding walls in divergent relation at an included angle of the order of 50°, said walls defining a forwardly widening trough-shaped mixing space forwardly of said gas port means, said mixing space being forwardly wide open for free and open discharge communication with the passing air stream, said mixing plate walls projecting laterally of said burner body with their back faces positioned to lie exposed to the air stream flowing past the burner, a plurality of apertures in said mixing plate walls spaced both longitudinally thereof and at different distances from said burner body, said apertures being smaller than the wall areas between the same and having a total area substantially less than the forward open discharge area of said mixing space, the inner apertures being of smaller capacity than the outer apertures, said burner body and divergent walls being shaped to divide and outwardly deflect the air stream flowing past the burner and cause such flow to create reduced pressure in said mixing space, and said apertures being positioned and arranged to admit and direct air from such passing air stream into the mixing space in distinct jets flowing obliquely forward and inward in said mixing space in front of said low-flame zone, said gas port means being operable to discharge variable amounts of gas fuel from said burner body to said low-flame zone and mixing space whereby to provide low flame combustion in said zone and progressively higher flame combustion involving progressively more of the spaced air jets in said mixing space.*

*12. A high turn-down ratio gas burner for operation in and for heating a low-pressure air stream flowing forward past the burner at a velocity of the order of 1500 to 4000 feet per minute, comprising in combination, an elongated burner body having means for connection to a supply of gas fuel and defining a feed passage and having a forward wall, means including gas port means connected to said passage for forming along said forward wall a variable low-rate burner for variable low-rate combustion of combustible gas fuel in a zone substantially shielded from the passing air stream and operable over a substantial turn-down range when supplied at varied rates with combustible gas fuel, shielding wall means connected to said burner body and extending forward in laterally spaced relation from opposite sides of said variable low-rate burner, said wall means defining in front of said variable low-rate burner a shielded zone in which said variable low-rate combustion can take place substantially independently of and shielded from the passing air stream and in which at higher combustion rates gas fuel can flow forwardly from said gas port means, mixing plates extending obliquely forward and outward from said shielding walls in widely divergent relation and defining at the front thereof a forwardly widening mixing space in open receptive communication with said shielded zone and having an open discharge at its forward end, said mixing plates being arranged for exposure to the air stream and for shielding said mixing space therefrom, means including a plurality of spaced rows of spaced apertures in said mixing plates for admitting jets of limited quantities of air from the passing air stream into said mixing space, said last-named means and the angular position of said mixing plates being arranged to cause said jets to stand in forwardly converging arrays of spaced jets, said apertures being of limited capacity and having a total area substantially less than the forward open discharge end of the mixing space between the plates, the apertures at the inner portion of the mixing space, adjacent said shielded zone, being relatively small and being proportioned to cooperate with said variable low-rate burner to provide air for progressively increased combustion, in said zone and inner mixing-space portion of gas fuel supplied through said port means, the apertures at outer portions of said mixing space being larger and being proportioned to supply additional air for progressively higher rate combustion in said mixing space of gas fuel supplied thereto through said port means and said low-rate zone, whereby said burner may be adjusted in operation from a high rate involving combustion at substantially all said air jets, through substantially continuous variation, down to a low rate of combustion at said low-rate burner inwardly of said air jets.*

*13. A high turn-down gas burner adapted for operation in an air stream flowing forwardly past the burner at a velocity of the order of 1500 to 4000 feet per minute, comprising an elongated burner body defining a gas fuel supply passage and having an elongated forward* wall to lie transversely of the direction of the air stream, said wall having gas port means at a series of points along its length, flame shielding walls extending forward from adjacent the sides of the body in spaced relation along opposite sides of said gas port means, defining a low flame zone in front of said gas port means, mixing plate walls extending obliquely forward and outward from said shielding walls in divergent relation at an included angle of more than 30°, said walls defining a forwardly widening trough-shaped mixing space forwardly of said gas port means, said mixing space being forwardly wide open for free and open discharge communication with the passing air stream, said mixing plate walls projecting laterally of said burner body with their back faces positioned to lie exposed to the air stream flowing past the burner, a plurality of apertures in said mixing plate walls spaced both longitudinally thereof and at different distances from said burner body, said apertures being smaller than the wall areas between the same and having a total area substantially less than the forward open discharge area of said mixing space, the inner apertures being of smaller capacity than the outer apertures, said burner body and divergent walls being shaped to divide and outwardly deflect the air stream flowing past the burner and cause such flow to create reduced pressure in said mixing space, and said apertures being positioned and arranged to admit and direct air from such passing air stream into the mixing space in distinct jets flowing obliquely forward and inward in said mixing space in front of said low-flame zone, said gas port means being operable to dishcarge variable amounts of gas fuel from said burner body to said low-flame zone and mixing space whereby to provide low flame combustion in said zone and progressively higher flame combustion involving progressively more of the spaced air jets in said mixing space.

14. A high turn-down gas burner adapted for operation in an air stream flowing forwardly past the burner at a velocity of the order of 1500 to 4000 feet per minute, comprising an elongated burner body defining a gas fuel supply passage and having an elongated forward wall to lie transversely of the direction of the air stream, said wall having gas port means at a series of points along its length, flame shielding walls extending forward from adjacent the sides of the body in spaced relation along opposite sides of said gas port means, defining a low-flame zone in front of said gas port means, mixing plate walls extending obliquely forward and outward from said shielding walls in divergent relation at an included angle of more than 30°, said walls defining a forwardly widening trough-shaped mixing space forwardly of said gas port means, said mixing space being forwardly wide open for free and open discharge communication with the passing air stream, said mixing plate walls projecting laterally of said burner body to effectively shield the mixing space from the air impinging upon the back faces of said mixing plate walls, a plurality of apertures in said mixing plate walls spaced both longitudinally thereof and at different distances from said burner body, said apertures being smaller than the wall areas between the same and having a total area substantially less than the forward open discharge area of said mixing space, the inner apertures being of smaller capacity than the outer apertures, said burner body and divergent walls being shaped to divide and outwardly deflect the air stream flowing past the burner and cause such flow to create reduced pressure in said mixing space, and said apertures being positioned and arranged to admit and direct air from such passing air stream into the mixing space in distinct jets flowing obliquely forward and inward in said mixing space in front of said low-flame zone, said gas port means being operable to discharge variable amounts of gas fuel from said burner body to said low-flame zone and mixing space whereby to provide low flame combustion in said zone and progressively higher flame combustion involving progressively more of the spaced air jets in said mixing space.

15. A high turn-down ratio gas burner for operation in and for heating a low pressure air stream flowing forward past the burner at a velocity of the order of 1500 to 4000 feet per minute, comprising in combination, an elongated burner body having means for connection to a supply of gas fuel and having a forward wall lying transversely of the direction of the air stream, gas port means located along said forward wall, wall means extending forwardly from said forward wall along opposite sides of said port means; said forward wall, gas port means, and wall means providing a variable low-rate burner for variable low-rate combustion of combustible gas fuel in a zone substantially shielded from the passing air stream and in which at higher combustion rates gas fuel can flow forwardly from said gas port means, mixing plates extending obliquely forward and outward from said wall means in widely divergent relation at an included angle of not less than 30° and defining at the front thereof a forwardly widening mixing space in open receptive communication with said port means and having an open discharge at its forward end, said mixing plates being arranged to shield said mixing space from air contacting the back faces of said mixing plates, said mixing plates being constructed so that a reduced pressure is produced in the mixing space as a result of the passage of said air over said back faces and ends of the plates, means including a plurality of spaced rows of spaced apertures in said mixing plates for admitting jets of limited quantities of said air into said mixing space, said aperture-including means and the angular position of said mixing plates being arranged to cause said jets to stand in forwardly converging arrays of spaced jets, said apertures being of limited capacity and having a total area substantially less than the forward open discharge end of the mixing space between the plates, the apertures at the inner portion of the mixing space, adjacent said gas ports, being relatively small and being proportioned to cooperate with said variable low-rate burner to provide air for progessively increased combustion, in said inner mixing-space portion, of gas fuel supplied through said port means, the apertures at outer portions of said mixing space being larger and being proportioned to supply additional air for progressively higher rate combustion in said mixing space of gas fuel supplied thereto through said port means, whereby said burner may be adjusted in operation from a high rate involving combustion at substantially all said air jets, through substantially continuous variation, down to a low rate of combustion at said low-rate burner.

16. A gas burner system, comprising a high turndown gas burner and means for generating a low pressure air stream having a substantially constant velocity within the range of up to approximately 4000 feet per minute for flowing forwardly past the burner, said burner including an elongated burner body, gas port means at a series of points along the burner body, shielding walls extending forwardly from adjacent the sides of the body in spaced relation along opposite sides of said gas port means defining a low-flame zone in front of and immediately adjacent said gas port means and independent of said air stream, means including said gas port means for causing a combustible mixture to exist in said low-flame zone, mixing plate walls supported on said shielding walls and extending forward and outward therefrom in gradually divergent relation, said walls defining a forwardly widening trough-shaped mixing space forwardly of said gas port means, said mixing space being forwardly wide open for free and open discharge communication with the passing air stream, said mixing plate walls projecting laterally of said burner body with their back faces positioned to lie exposed to the air stream flowing past the burner, a plurality of apertures in said mixing plate walls spaced at different distances from said burner body, said burner

*body and divergent walls being shaped to divide and outwardly deflect the air stream flowing past the burner to cause such flow to create reduced pressure in said mixing space, and said apertures being positioned and arranged to admit and direct air from such passing air stream into the mixing space in distinct jets flowing obliquely forward and inward in said mixing space in front of said low-flame zone, said gas port means being operable to discharge variable amounts of gas fuel from said burner body to said low-flame zone and mixing space.*

*17. A gas burner system, comprising a high turndown gas burner capable of operating at low, intermediate and high firing rates, and means for generating a substantially constant low pressure air stream having a substantially constant velocity of not more than approximately 4000 feet per minute for flowing forwardly past the burner, said burner including an elongated burner body, gas port means at a series of points along the burner body, shielding walls extending forwardly from adjacent the sides of the body in spaced relation along opposite sides of said gas port means and defining a low-flame zone in front of and immediately adjacent said gas port means, including said gas port means for causing a combustible mixture to exist in said low-flame zone, mixing plate walls supported from said shielding walls and extending forward and outward therefrom in divergent relation to define forwardly of said gas port means a forwardly widening trough-shaped mixing space that is forwardly wide open for free and open discharge communication with the passing air stream, said mixing plate walls projecting laterally of said burner body with their back faces positioned to lie exposed to the constant velocity air stream flowing past the burner, a plurality of apertures in said mixing plate walls spaced at different distances from said burner body, said apertures being positioned and arranged to admit and direct part of the air from such passing air stream into the mixing space in distinct jets flowing obliquely forward and inward in said mixing space in front of said low-flame zone, said jets being of substantially constant configuration irrespective of whether the burner is operating at low, intermediate, or high firing rate, said burner body and mixing plate walls being shaped to divide and outwardly deflect the air stream flowing past the burner such that the balance of the air stream not admitted through the apertures passes along said walls and past the burner to create a reduced pressure in said mixing space, said gas port means being operable to discharge variable amounts of gas fuel from said burner body to said low-flame zone and mixing space to cause at intermediate and high firing rates admixture and combustion of said gas fuel and said air jets thereby heating that part of the air that is within said mixing space, and finally to cause the air so heated to pass forwardly of the burner to reunite with and heat the balance of the air, without appreciably increasing the velocity or pressure of said balance of the air and therefore of the air stream flowing past the burner.*

References Cited in the file of this patent or the original patent

UNITED STATES PATENTS

| | | |
|---|---|---|
| 1,536,631 | Reineke | May 5, 1925 |
| 2,018,582 | Theunissen | Oct. 22, 1935 |
| 2,333,531 | Ferguson | Nov. 2, 1943 |
| 2,588,728 | Hundstad | Mar. 11, 1952 |
| 2,595,999 | Way et al. | May 6, 1952 |
| 2,606,014 | Baumann | Aug. 5, 1952 |
| 2,649,907 | Jacobson | Aug. 25, 1953 |
| 2,759,721 | Lee | Aug. 21, 1956 |
| 2,853,284 | Freeman | Sept. 23, 1958 |

FOREIGN PATENTS

| | | |
|---|---|---|
| 219,678 | Great Britain | Nov. 27, 1924 |
| 364,063 | Great Britain | Dec. 30, 1931 |
| 489,210 | Canada | Dec. 30, 1952 |